Jan. 17, 1961   O. B. ELLIOTT   2,968,362
WHEEL BEARING GREASER
Filed Jan. 27, 1959
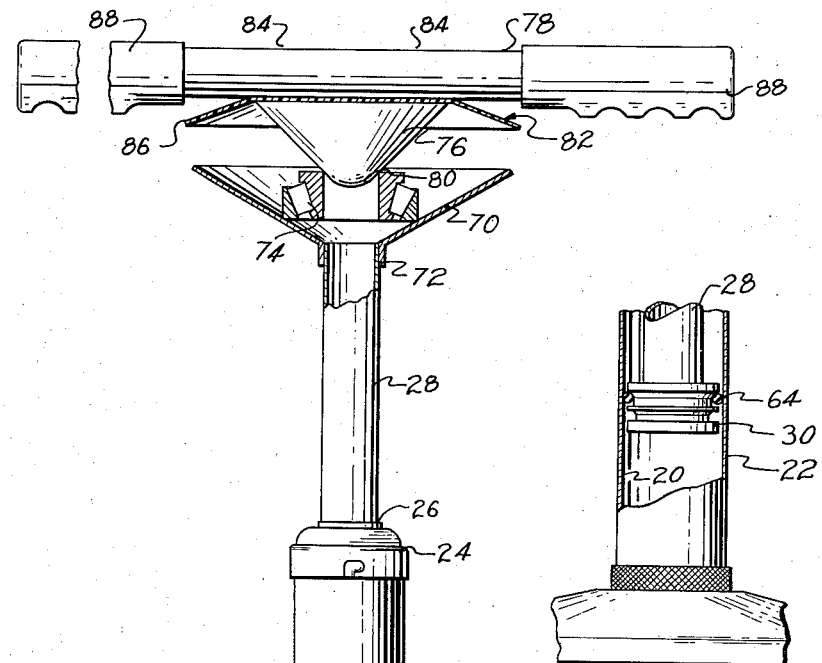
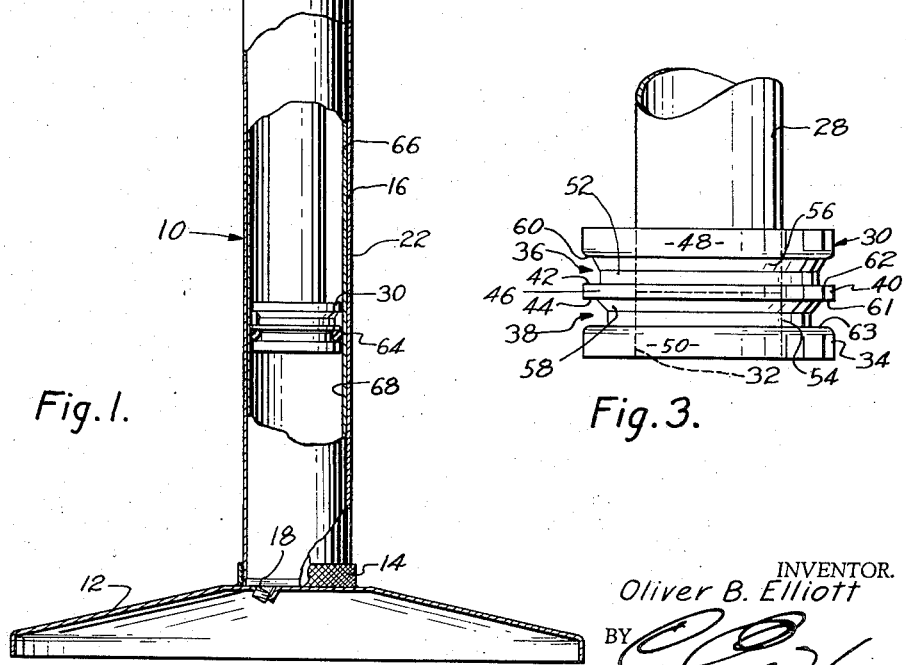
INVENTOR.
Oliver B. Elliott
BY
ATTORNEY

United States Patent Office 2,968,362
Patented Jan. 17, 1961

2,968,362

WHEEL BEARING GREASER

Oliver B. Elliott, 150 Hillsdale, Wichita, Kans.

Filed Jan. 27, 1959, Ser. No. 789,389

1 Claim. (Cl. 184—1)

This invention relates to lubricating equipment and more particularly to a device for greasing or packing wheel bearings of vehicles.

The most important object of this invention is to provide a wheel bearing greaser which is equipped with a two stage piston within a cylinder, the cylinder being adapted to be filled with grease or alternatively to receive a prepacked tube or cartridge of grease. Thus the present invention is designed to take full advantage of recent developments in the packaging of lubricants which have resulted in the pre-packing of grease in tubes or cartridges.

A further object of this invention is to provide a wheel bearing greaser having a cylinder reciprocably receiving a two stage piston, the piston having a pair of annular channels of varying depths in the outer face thereof for selectively receiving a ring of resilient material and a tubular stem connected to the piston and communicating with the cylinder whereby the contents of the cylinder or of a tube placed within the cylinder may be delivered to a bearing carried by a tray at the opposite end of the stem.

A yet further aim of the invention is to provide a cover for the tray which receives the bearing, the cover being transparent whereby the bearing may be viewed as it is being lubricated.

Other objects of the invention will become apparent from the following specification, reference being made to the accompanying drawing wherein:

Fig. 1 is an elevational view of the wheel bearing greaser, parts being broken away and in section to reveals details of construction;

Fig. 2 is a fragmentary, partially sectional view of the base and one end of the cylinder showing the piston with its associated ring in a position engaging the inner face of the cylinder wall; and Fig. 3 is an enlarged, elevational view of the piston and a portion of the stem.

Greaser 10 has a base 12 provided with an upstanding, internally threaded annular flange 14 which receives the lower end of an elongated hollow cylinder 16, the lower end of cylinder 16 being threaded to engage flange 14. Base 12 serves as a closure for the lower end of cylinder 16 there being provided, however, a normally plugged opening 18 through base 12 by which access may be had to the interior of cylinder 16. Cylinder 16 is preferably formed of metal and has an inner face 20 and an outer face 22.

The normally upper end of cylinder 16 is closed by a cap 24, the cap 24 being secured to said end of the cylinder 16 in any suitable manner, such as by a bayonet joint as illustrated. Slidable through an opening 26 formed in cap 24 is a tubular stem 28 which extends axially of cylinder 16.

Stem 28, at its lowermost end within cylinder 16, is connected to a piston 30, stem 28 and piston 30 being reciprocable within cylinder 16. Piston 30 is annular and has a passage 32 formed through the center thereof, passage 32 receiving and having secured therewithin, the lowermost open end of stem 28 whereby the tubular stem 28 may communicate with the interior of cylinder 16 through passage 32.

The outer face 34 of piston 30 has a first, normally uppermost channel 36 and a second, normally lowermost channel 38 formed therein. A flange 40 is disposed between channels 36 and 38 and separates said channels. The normally uppermost face 42 of flange 40 forms one wall of channel 36 and the opposed face 44 of said flange forms a portion of one wall of channel 38. Peripheral edge 46 of flange 40 is in substantial alignment with outermost marginal edges 48 and 50 of outer face 34 of piston 30. Channels 36 and 38 have bottoms 52 and 54 respectively. The normally uppermost walls 56 and 58 of channels 36 and 38 respectively are each initially inclined upwardly and outwardly from bottoms 52 and 54 respectively. The inclined portions of walls 56 and 58 each merge with relatively short, horizontally disposed, flat stretches 60 and 61 respectively which form a continuation of said walls 56 and 58. The opposite, normally lowermost walls 62 and 63 of channels 36 and 38 respectively are flat and disposed in spaced, substantially parallel planes, wall 62 consisting of face 42 of flange 40.

One of the channels is of greater depth than the other and, as illustrated it is preferred that channel 38, the lowermost of the pair of channels, be of greater depth than channel 36.

A ring 64 of resilient material is adapted to be selectively inserted in either channel 36 or 38 depending upon whether or not cylinder 16 is itself utilized to hold packing grease or a prepacked tube of grease such as 66 is inserted therewithin. As illustrated in Fig. 1 a tube 66 has been inserted within cylinder 16 and in view of the fact that the insertion of tube 66 serves to reduce the inside diameter of cylinder 16, ring 64 is placed in the deepest channel 38 whereby piston 30 and its ring 64 may reciprocate relatively easily within tube 66 but yet ring 64 may be retained in frictional, wiping engagement with the inner face 68 of tube 66.

If greaser 10 is to be used without tube 66, ring 64 is moved manually to relatively more shallow channel 36 and is thus retained in wiping, frictional engagement with inner face 20 of cylinder 16 as the piston 30 is reciprocated. It can be appreciated that ring 64 will seat firmly within either channel 36 or 38 and that the inclined portions of the respective walls 56 and 58 thereof will tend to urge ring 64 outwardly to insure a suitable engagement with either inner face 68 of tube 66 or inner face 20 of cylinder 16 as the case may be, when the piston 30 is moved downwardly.

A tray 70 is carried by the end of stem 28 opposite that connected to piston 30, the tray 70 being in surrounding relationship to the normally uppermost, open end of tubular stem 28 and being secured thereto by an integral, depending flange 72 which is threaded on or otherwise suitably secured to stem 28. Tray 70 receives a bearing such as 74 and the tray 70 of such configuration that bearing 74 is maintained within tray 70 and in a position directly over the uppermost open end of stem 28 whereby grease passing upwardly through stem 28 will move directly into bearing 74. To accomplish this result it is preferable that tray 70 be substantially dish-shaped as illustrated in Fig. 1.

Cooperating with tray 70 to hold bearing 74 in a predetermined position is conical member 76 which depends from a handle 78, the tip 80 of member 76 seating within bearing 74 and insuring that the bearing 74 will not move laterally within tray 70 as it is being greased. A cover 82 of transparent material such as a clear plastic is interposed between handle 78 and member 76 and is held in place by fastening means such as screws 84 which also serve to secure member 76 to handle 78. Cover 82 has a slightly downturned marginal flange 86, which overlies the upper rim of tray 70 when the bearing 74 is removed therefrom and the greaser 10 is not in use. When the cover 82 is so positioned, tip 80 of member 76 substantially closes the upper end of stem 28 and thus it is virtually impossible for dirt or any other foreign matter to reach the contents of cylinder 16 or tube 66 when the greaser is not in use. It can also be appreciated that the provision of a transparent cover such as 82 makes it possible for the operator of greaser 10 to view the lubrication of bearing 74 as the same takes place and thus insure that such is properly accomplished.

In operation and utilizing a prepacked tube of grease such as 66, the cap 24 is removed from cylinder 16, stem 28 and piston 30 are pulled out of the cylinder, tube 66 is inserted therewith, the open end of tube 66 being up, ring 64 is placed in deeper channel 38 and piston 30 and stem 28 are inserted within tube 66 and cap 24 secured to cylinder 16. A bearing such as 74 is then placed in tray 70, the tip 80 of member 76 is engaged with bearing 74 and downward pressure is exerted on handle 78 by utilizing grips such as 88. Such pressure moves stem 28 and thus piston 30 downwardly against the contents of tube 66 forcing the same into passage 32, through stem 28 and thence into bearing 74 and tray 70.

The operation of greaser 10 without tube 66 and using cylinder 16 to contain the grease is substantially the same, except of course, ring 64 must be placed in its expanded position within channel 36 to insure the necessary engagement with inner face 20 of cylinder 16. When so using the greaser 10, cylinder 16 may be filled with grease by any suitable means. Thus, opening 18 may be used and grease forced therethrough by pressure and if such is done it is not necessary to remove the stem 28 and piston 30 from within cylinder 16 prior to filling it with grease. On the other hand cap 24, stem 28 and piston 30 may be removed from cylinder 16 and grease loaded into the cylinder 16 through the open top thereof.

Having thus described the invention what is claimed as new and desired to be secured by Letters Patent is:

In apparatus for dispensing grease, an elongated, hollow cylinder adapted to receive within a length thereof adjacent one of its ends either a quantity of grease in bulk or a grease-filled cartridge having a cylindrical wall of lesser inner diameter than said cylinder; means for closing said one end of said cylinder; an elongated, grease delivery tube extending from within said cylinder out the other end of said cylinder; means mounting said tube for axial reciprocatory movement relative to said cylinder; a tubular piston within said cylinder and mounted on said tube adjacent the end of the latter within said cylinder for reciprocation with said tube; a resilient O-ring; and means for cooperating with said O-ring to provide a similar seal between said piston and either said cylinder or said wall, said means comprising a pair of circumferential, annular grooves in said piston of different radial depths and each adapted to receive said O-ring.

References Cited in the file of this patent

UNITED STATES PATENTS

| | | |
|---|---|---|
| 1,377,023 | Nelson | May 3, 1921 |
| 1,379,281 | Owens | May 24, 1921 |
| 1,555,711 | Hershinger | Sept. 29, 1925 |
| 2,168,746 | Saal et al. | Aug. 8, 1939 |
| 2,178,816 | Sibley | Nov. 7, 1939 |
| 2,420,104 | Smith | May 6, 1947 |
| 2,489,809 | Owens | Nov. 29, 1949 |